United States Patent [19]

Hagen et al.

[11] Patent Number: 5,248,428
[45] Date of Patent: Sep. 28, 1993

[54] ARTICLE FOR SEPARATIONS AND PURIFICATIONS AND METHOD OF CONTROLLING POROSITY THEREIN

[75] Inventors: Donald F. Hagen, Woodbury; William V. Balsimo, Afton, both of Wash.; Robin E. Wright, Inver Grove Heights; Craig G. Markell, White Bear Township, Ramsey County, both of Minn.

[73] Assignee: Minnesota Mining and Manufacturing Company, St. Paul, Minn.

[21] Appl. No.: 985,442

[22] Filed: Dec. 3, 1992

Related U.S. Application Data

[63] Continuation of Ser. No. 722,665, Jun. 28, 1991, abandoned.

[51] Int. Cl.⁵ .......................................... B01D 15/08
[52] U.S. Cl. .................................. 210/656; 210/198.2; 210/469; 210/500.36; 210/502.1; 210/503; 210/508; 210/679; 428/323; 428/327; 428/328; 428/329; 428/402.21; 428/422; 96/101
[58] Field of Search ............. 210/198.2, 469, 500.36, 210/502.1, 502, 508, 656, 679; 55/386; 428/323, 327, 328, 329, 402.21, 422

[56] References Cited

U.S. PATENT DOCUMENTS

| | | | |
|---|---|---|---|
| 3,281,511 | 10/1966 | Goldsmith | 264/49 |
| 3,407,096 | 10/1968 | Landi | 136/86 |
| 3,407,249 | 10/1968 | Landi | 264/49 |
| 3,556,161 | 1/1971 | Roberts | 138/141 |
| 3,615,972 | 10/1971 | Morehouse, Jr. | 428/321.5 |
| 4,153,661 | 5/1979 | Ree et al. | 264/120 |
| 4,199,628 | 4/1980 | Caines | 428/36 |
| 4,208,194 | 6/1980 | Nelson | 55/158 |
| 4,239,516 | 12/1980 | Klein | 210/505 |
| 4,265,952 | 5/1981 | Caines | 428/36 |
| 4,373,519 | 2/1983 | Errede et al. | 128/156 |
| 4,460,642 | 7/1984 | Errede et al. | 428/283 |

(List continued on next page.)

FOREIGN PATENT DOCUMENTS

| | | |
|---|---|---|
| 0102335 | 3/1984 | European Pat. Off. |
| 2024886 | 1/1980 | United Kingdom |
| WO8500020 | 1/1985 | World Int. Prop. O. |
| WO8503013 | 7/1985 | World Int. Prop. O. |

OTHER PUBLICATIONS

Assignee's copending application Ser. No. 07/639,515.
Design News, "Particulates Captured/Carried by Fibrillated PTFE", Feb. 9, 1987 (Cahners Publishing Company.
Hagen, et al., "Membrane Approach to Solid Phase Extractions," Analytica Chimica Acta, 236 (1990) 157–164.
Assignee's copending application Ser. No. 07/332,541.
Assignee's copending application Ser. No. 07/651,791.
Assignee's copending application Ser. No. 07/776,601.
Assignee's copending application Ser. No. 07/776,098.
Assignee's copending application Ser. No. 07/828,513.
Assignee's copending application Ser. No. 07/829,764.
H. Figge et al., "Journal of Chromatography" 351 (1986) 393–408.
L. Botz et al, Journal of Liquid Chromatography. 13(14), 2809–2828 (1990).

Primary Examiner—Robert A. Dawson
Assistant Examiner—Sun Uk Kim
Attorney, Agent, or Firm—Gary L. Griswold; Walter N. Kirn; Lorraine R. Sherman

[57] ABSTRACT

A composite article comprising, in the unexpanded form, a fibrillated PTFE matrix and a combination of energy expandable hollow polymeric particles and sorptive particles, which composite, on applying energy such as steam, heat, or laser energy, provides an expanded article having increased void volume and decreased density. The expanded articles are porous and efficient articles for separation and purification applications. In flat or rolled form, the composite article can be used in separation devices.

21 Claims, 3 Drawing Sheets

U.S. PATENT DOCUMENTS

| | | | |
|---|---|---|---|
| 4,483,889 | 11/1984 | Anderson | 427/389.9 |
| 4,565,663 | 1/1986 | Errede et al. | 264/120 |
| 4,640,933 | 2/1987 | Park | 264/53 |
| 4,694,027 | 9/1987 | Park | 264/53 |
| 4,765,915 | 8/1988 | Diehl | 210/505 |
| 4,810,381 | 3/1989 | Hagen et al. | 210/502.1 |
| 4,902,747 | 2/1990 | Kassal et al. | 525/151 |
| 4,906,378 | 3/1990 | Hagen et al. | 210/635 |
| 4,914,156 | 4/1990 | Howe | 525/166 |
| 4,923,737 | 5/1990 | De La Torre | 428/217 |
| 4,945,125 | 7/1990 | Dillon et al. | 527/427 |
| 4,962,136 | 10/1990 | Peters | 523/220 |
| 4,966,941 | 10/1990 | Subramanian | 525/66 |
| 4,971,697 | 11/1990 | Douden et al. | 210/502.1 |
| 4,971,736 | 11/1990 | Hagen et al. | 264/22 |
| 4,985,296 | 1/1991 | Mortimer | 428/220 |
| 4,986,909 | 1/1991 | Rai et al. | 210/502.1 |
| 4,990,544 | 2/1991 | Kamakura et al. | 521/145 |
| 5,019,232 | 5/1991 | Wilson et al. | 204/182.8 |
| 5,071,610 | 12/1991 | Hagen et al. | 264/120 |
| 5,104,632 | 4/1992 | Douden et al. | 210/502.1 |

ARTICLE FOR SEPARATIONS AND PURIFICATIONS AND METHOD OF CONTROLLING POROSITY THEREIN

This is a continuation of application No. 07/722,665 filed Jun. 28,1991, now abandoned.

FIELD OF THE INVENTION

This invention relates to a porous particle loaded sheet of fibrillated polytetrafluoroethylene (PTFE) comprising a combination of sorptive particles and energy expandable or expanded polymeric particles, and a process therefor. The sheet is useful in separations and purification applications.

BACKGROUND ART

The background art teaches various formulations for blending an aqueous PTFE dispersion with various additives and/or adjuvants designed for specific purposes. For example, U.S. Pat. No. 4,990,544 teaches a gasket comprising a fibrillated PTFE resin and a fine inorganic powder dispersed therein. U.S. Pat. No. 4,985,296 teaches an expanded, porous PTFE film containing filler material which is purposely compressed to provide thin films where space reduction is desirable.

Assignee's patent application U.S. Ser. No. 07/639,515 (now allowed) discloses a method of controlling the porosity in a composite PTFE article by controlling the amount of lubricant used during processing of the article. The article also has controlled mean pore size. *Design News*, "Particulates Captured/Carried by Fibrillated PTFE", Feb. 9, 1987 (Cahners Publishing Company), discloses particles carried by fibrillated PTFE membranes having a porosity in the range of 30 to 70%, and pore sizes from 0.01 to 5.0 microns.

U.S. Pat. Nos. 4,971,736, 4,906,378, and 4,810,381 disclose a composite chromatographic sheet-like article and method therefor. The article comprises a PTFE fibril matrix and non-swellable sorptive hydrophobic particles enmeshed in the matrix. References cited in these patents relate to other PTFE matrices containing particulates. U.S. Pat. No. 4,971,697 teaches a chromatographic article comprising a PTFE fibril matrix having enmeshed therein a mixture of none-swellable sorptive particles and hydrated silica flakes. Hagen, et al., "Membrane Approach to Solid Phase Extractions", *Analytica Chimica Acta*, 236 (1990) 157–164, relates to particle loaded PTFE matrices useful in extraction applications.

U.S. Pat. No. 4,460,642 teaches a water-swellable composite sheet of microfibers of PTFE and hydrophilic absorptive particles enmeshed therein which is useful as a wound dressing.

U.S. Pat. No. 4,923,737 discloses a method for a "metal cloth" prepared from fibrillated PTFE containing metal or other particles entrapped in the fibrils.

In regard to polymers, fibrillated PTFE has also been combined with a polyamide to provide articles by extrusion blow-molding (U.S. Pat. No. 4,966,941) and with an elastomer to provide articles with increased durability (U.S. Pat. No. 4,962,136). U.S. Pat. No. 4,945,125 teaches a process of producing a fibrillated semi-interpenetrating polymer network of PTFE and silicone elastomer. U.S. Pat. No. 4,914,156 describes a blow moldable composition comprising a polyether, an epoxide polymer, a source of catalytic cations, and a fibrillatable PTFE. U.S. Pat. No. 4,902,747 discloses a polyarylate composition containing fibrillatable PTFE.

U.S. Pat. Nos. 4,199,628 and 4,265,952 relate to a vermicular expanded graphite composite blended with a corrosion resistant resin such as PTFE with improved impermeability to corrosive fluids at high temperatures.

U.S. Pat. No. 4,483,889 discloses the method of making a composite material comprised of a fibrous matrix, expandable polymeric microbubbles, and a formaldehyde-type resin involving distributing the expandable microspheres (either expanded or unexpanded) into the fiber matrix, expanding the polymeric bubbles by application of heat (in the case where unexpanded microbubbles were used), and impregnating the resulting porous matrix with a curable formaldehyde-type resin to give a foam.

U.S. Pat. Nos. 3,407,096, 3,407,249, 3,556,161, and 3,281,511 teach incorporation of extractable or leachable filler particles to create porosity in an article.

SUMMARY OF THE INVENTION

Briefly, the present invention provides a composite sheet-like article useful in at least one of separations and purification applications comprising:

(a) a polytetrafluoroethylene (PTFE) fibril matrix, and (b) a combination of sorptive particulate and energy expandable, or energy expanded. hollow polymeric particulate enmeshed in the matrix.

Preferably, the weight ratio of PTFE to total particulate is in the range of 2:98 to 50:50, more preferably 5:95 to 25:75.

Preferably, the weight ratio of sorptive particulate to energy expanded or expandable polymeric particulate is in the range of 3:1 to 1000:1, more preferably 5:1 to 500:1.

In another aspect, this invention provides a method of controlling interstitial porosity in a composite sheet-like article useful in at least one of separations and purification applications. The amount of energy expandable particulate in the fibril matrix controls interstitial porosity in the expanded sheet-like article.

What the background has not taught but what this invention teaches is a composite article comprising, in an unexpanded form, a fibrillated PTFE matrix, sorptive particulate, and energy-expandable hollow polymeric particles, which composite, on applying energy such as steam, heat or laser energy, provides an expanded article whose porosity is greater than that of the unexpanded form of the article. The expanded articles are porous and efficient articles for separations and purification applications.

In this application:

"sorptive" means microporous and capable of being active in separations and purification applications.

Assignee's copending patent, application, U.S. Ser. No. 07/723,064 filed Jun. 28, 1991, discloses composite articles comprising a fibrillated polyolefin matrix and energy expandable or expanded particulate enmeshed therein which are useful thermal insulators.

DETAILED DESCRIPTION OF THE DRAWINGS

FIGS. 1-4, see Example 1, below.

Figure 5:
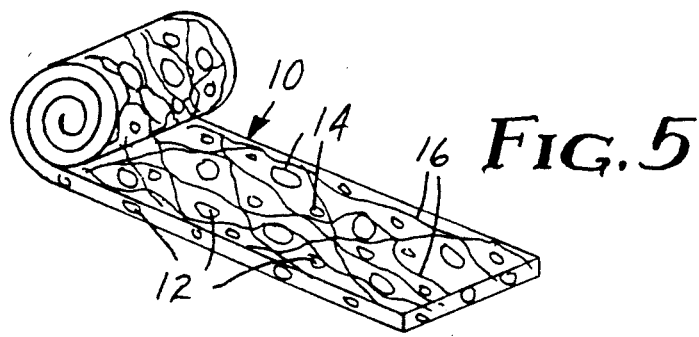
FIG. 5 is an enlarged perspective view of a portion of an unexpanded article of the invention.

FIG. 5 is a perspective view of partially rolled sheet 10 of the article of the invention. Energy expandable particulate 12 and sorptive particulate 14 are enmeshed in PTFE fibril matrix 16.

Figure 6:
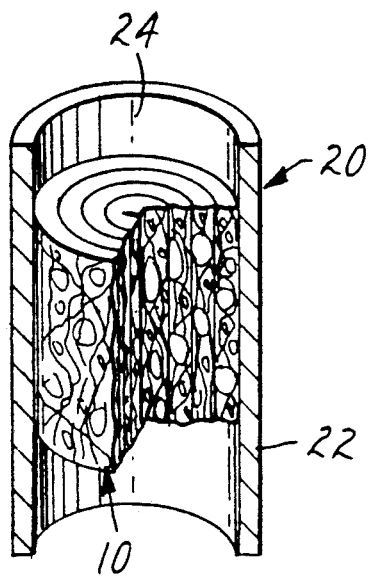
FIG. 6 is an enlarged perspective view showing an article of the invention in use in a column.

FIG. 6 is an enlarged perspective view showing packed column 20 containing article 10 of FIG. 5 which has been rolled up, placed in chromatographic column 22, and subjected to energy to expand article 10 so that it snugly fills a portion of the interior cavity 24 of column 22.

Figure 7:
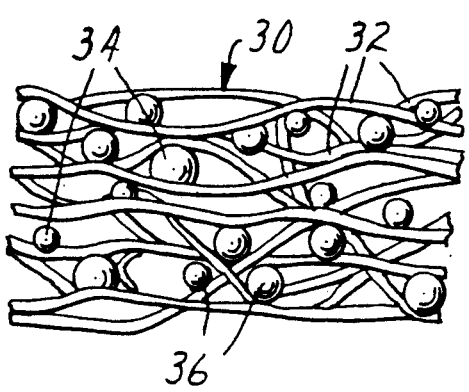
FIG. 7 is a cross-sectional view, greatly enlarged, of the energy expandable sheet-like article of the invention.

FIG. 7 shows one embodiment of a cross-sectional view, greatly enlarged, of the sheet like article 30 of the invention having PTFE fibrils 32 in which are enmeshed sorptive particulate 34 and energy expandable particulate 36.

Figure 8:
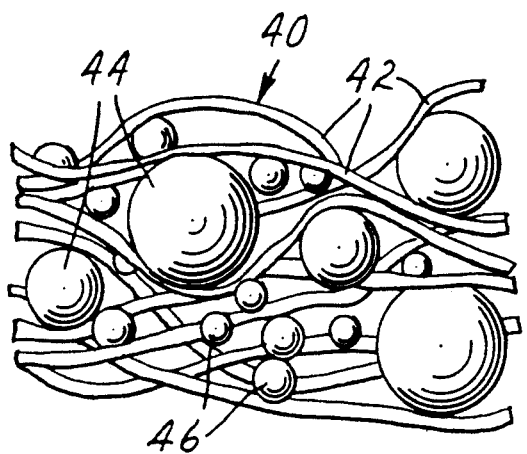
FIG. 8 is a cross-sectional view, greatly enlarged, of the energy expanded sheet-like article of FIG. 7.

FIG. 8 shows sheet-like article 40 provided after application of energy to the article of FIG. 7. Fibrils 42 have expanded particles 44 and sorptive particles 46 enmeshed therein.

DETAILED DESCRIPTION OF PREFERRED EMBODIMENTS

Controlled interstitial porosity in sheet-like articles comprising a fibrillated PTFE matrix and sorptive particulate enmeshed therein can be achieved by further incorporating therein in the range of 0.05 to 25 weight percent of energy expandable or expanded hollow polymeric particles.

Expandable particulate material useful in the present invention can be swellable or non-swellable in aqueous or organic liquid, and preferably is substantially insoluble in water or organic liquids. In addition, the expandable particulate is not homogeneous, i.e., it is not a uniform bead of polymer but rather comprises a polymeric shell having a central core comprised of a fluid, preferably liquid, material. A further requirement is that the overall dimensions of the expandable particulate increase upon heating at a specific temperature. This expansion or intumescence is different from expansion due to solvent swelling and can occur in the dry state (i.e., in the absence of solvent).

Expandable particulate includes those materials comprised of a polymeric shell and a core of at least one other material, either liquid or gaseous, most preferably a liquid at room temperature, in which the polymeric shell is essentially insoluble. A liquid core is advantageous because the degree of expansion is directly related to the volume change of the core material at the expansion temperature. For a gaseous core material, the volume expansion expected can be approximated from the general gas laws. However, expandable particulate comprising liquid core material offers the opportunity to provide much larger volume changes, especially in those cases where a phase change takes place, i.e., the liquid volatilizes at or near the expansion temperature. Gaseous core materials include air and nonreactive gases and liquid core materials include organic liquids.

Preferred energy expandable particulate (also called microbubbles, microballoons, and microspheres) have shells comprising copolymers of vinyl chloride and vinylidene chloride, copolymers of vinyl chloride and acrylonitrile, copolymers of vinylidene chloride and acrylonitrile, and copolymers of styrene and acrylonitrile. Further can be mentioned copolymers of methyl methacrylate containing up to about 20 percent by weight of styrene, copolymers of methyl methacrylate and up to about 50 percent by weight of ethyl methacrylate, and copolymers of methyl methacrylate and up to about 70 percent by weight of orthochlorostyrene.

The unexpanded microspheres contain fluid, preferably volatile liquid, i.e., a blowing agent, which is conventional for microspheres of the type described here. Suitably, the blowing agent is 5 to 30 percent by weight of the microsphere. The microspheres can be added in different manners, as dried particles, wet cakes, or in a suspension, e.g., in an alcohol such as isopropanol. The microspheres can also be added in a pre-expanded form.

The unexpanded particulate desirably is in the size range of from about 0.5 micrometer to about 200 micrometers, preferably from 1 micrometer to 100 micrometers, most preferably from 3 micrometers to 50 micrometers. After expansion, the volume of the expandable particulate increases by a factor of at least 1.5, preferably a factor of at least 5, and most preferably a factor of at least 10, and may even be as high as a factor of about 100.

As an example, Expancel polymeric microspheres (Nobel Industries, Sundsvall, Sweden) expand from an approximate diameter of 10 micrometers in the unexpanded form to an approximate diameter of 40 micrometers after expansion. The corresponding volume increase is $$V_f/V_i = (r_f/r_i)^3 = 4^3,$$

or 64-fold, where $V_f$ and $r_f$ are the final volume and radius of the expandable particulate, respectively, after expansion, and $V_i$ and $r_i$ are the corresponding initial values for the unexpanded particulate. Expanded particulate provides increased interstitial porosity in the sheet material.

Preparation of expandable particulate is normally accomplished by suspension polymerization. A general description of some of the techniques that can be employed and a detailed description of various compositions that are useful as expandable particulate can be found in U.S. Pat. No. 3,615,972. A further description of compositions useful as expandable particulate in the present invention is given in U.S. Pat. No. 4,483,889. Both patents are incorporated herein by reference.

Examples of commercially available expandable hollow polymeric microspheres useful in the present invention include those made of poly(vinylidene chloride-co-acrylonitrile) such as Expancel TM 820, Expancel TM 642, Expancel TM 551, Expancel TM 461, and Expancel ™ 051 polymeric microspheres. Other commercially available materials having similar constructions, and comprising, for example, a shell of methacrylonitrile-acrylonitrile copolymer, available as Micropearl ™ F-80K microbubbles (Matsumoto Yushi-Seiyaku Co., Ltd., Japan), are also useful as expandable particulate in the present invention.

A wide variety of blowing or raising agents may be incorporated within the polymerization process. They can be volatile fluid-forming agents such as aliphatic hydrocarbons including ethane, ethylene, propane, propene, butene, isobutene, neopentane, acetylene, hexane, heptane, or mixtures of one or more such aliphatic hydrocarbons preferably having a number average molecular weight of at least 26 and a boiling point at atmospheric pressure about the same temperature range or below the range of the softening point of the resinous material of the polymeric shell when saturated with the particular blowing agent utilized.

Other suitable blowing agents are halocarbons such as perfluorobutanes, perfluoropentanes, perfluorohexanes, fluorotrichloromethane, dichlorodifluoromethane, chlorotrifluoromethane, trichlorotrifluoroethane, heptafluorochlorocyclobutane, and hexafluorodichlorocyclobutane, and tetraalkyl silanes such as tetramethyl silane, trimethylethyl silane, trimethylisopropyl silane, and trimethyl-n-propyl silane, all of which are commercially available.

The shape of the expandable particulate is preferably spherical but is not restricted to spherical, i.e., it may be irregular. Other shapes can easily be envisioned such as urnlike as described in U.S. Pat. No. 3,615,972. The shape and orientation of the expandable particulate in the composite article determine the anisotropy of the expansion step. Where essentially spherical expandable particles are used, heating leads to isotropic expansion of the composite, i.e., there is no preferred direction of expansion and all three axes expand uniformly so that the overall shape of the article does not change, only its size. Other physical constraints that may have been imposed on the article, such as during processing or by anchoring one part of the article prior to expansion, may lead to less than perfect isotropic expansion where essentially spherical expandable particulate is used.

As a result of the expansion of the expandable particulate, the volume of the composite article increases. The percent volume increase is dependent on a number of factors such as the loading of expandable particulate in the composite and the molecular weight of the polymeric shell of the expandable particulate. The decrease in article density is inversely proportional to the volume increase of the article.

Thickness of the composite article prior to expansion can range from about 0.0127 cm to about 0.32 cm, preferably from about 0.018 cm to 0.25 cm, most preferably from about 0.025 cm to about 0.127 cm. When the article is too thin, it has very little structural integrity while articles having thicknesses outside of the given range may be difficult to form. Thickness after expansion is dependent on several factors, as stated above. Thinner articles can be made by densification as is described in U.S. Pat. No. 4,985,286. Alternatively, densification can be accomplished by solvent extraction of the polymeric microspheres.

Chromatographic sheet-like articles and method of preparation have been disclosed in U.S. Pat. Nos. 4,810,381, 4,906,378, and 4,971,736, which are incorporated herein by reference. Sorptive particulate useful in the sheet-like articles of the present invention are disclosed therein.

The sorptive particulate material (which can be one material or a combination of materials) useful in the present invention is non-swellable in aqueous and organic media and is substantially insoluble in water or the elution solvent. Not more than 1.0 gram of particulate will dissolve in 100 g. of aqueous media or elution solvent into which particulate is mixed at 20° C. The sorptive particulate material can be carbon, an organic compound, a polymer, or an inorganic oxide such as silica, alumina, titania, zirconia, and other ceramics, or it can be ion exchange or chelating particles. Preferred particulate material are silica and zirconia, with silica being particularly preferred because of the ease in bonding a variety of hydrophobic and semi-hydrophobic coatings onto its surface and because they are commercially available.

Silica is available from Aldrich Chemical Co. (Milwaukee, Wis.). Zirconia is available from Z. Tech Corporation (Bow, N.H.). Other inorganic oxides are available from Aldrich Chemical Co.

Suitable sorptive particles for the purposes of this invention include any particle which can be coated with insoluble, non-swellable sorbent material or the surface (external and/or internal) of which can be derivatized to provide a coating of insoluble, non-swellable sorbent material. Preferred supports for such coatings include carbon and inorganic oxide particles, most preferably silica particles. Such particles having coated surfaces are well known in the art, see, for example, Snyder and Kirkland. "Introduction to Modern Liquid Chromatography", 2d Ed., John Wiley & Sons, Inc. (1979) and H. Figge et al., "Journal of Chromatography" 351 (1986) 393–408. The coatings can be mechanically applied by in situ crosslinking of polymers or the coatings can be functional groups covalently bonded to the surface of the particles. Many such coated particles are commercially available (e.g., $C_{18}$ bonded phase silica, Alltech, Deerfield, Ill.).

Sorptive coatings which can be applied to silica particulate can be either thin mechanical coatings of insoluble, non-swellable polymers such as crosslinked silicones, polybutadienes, etc. or covalently bonded organic groups such as aliphatic groups of varying chain length (e.g., $C_2$, $C_8$, and $C_{18}$) and aliphatic or aromatic groups containing amine, nitrile, hydroxyl, chiral, and other functionalities which alter the polarity of the coating. The silica, or other support particle, in this case acts primarily as a carrier for the organic coatings and the particles are non-swellable. The variation in chemical composition of the coatings provides selectivity in molecular separations and polarity.

The sorptive particulate material may have a spherical shape, a regular shape or an irregular shape. Sorptive particulate material which has been found useful in the invention has an apparent size within the range of 0.1 to about 600 micrometers, preferably in the range of 1 to 100 micrometers. It has been found advantageous in some instances to employ particulate materials in two or more particle size ranges falling within the broad range. As an example, particles having an average size in the range of 0.1–30 micrometers and even up to 100 micrometers having chromatographic activity may be employed in combination with particles having an average size in the range 1 to 250 micrometers acting as a property modifier.

Some particle size reduction may take place during the high shear mixing and the calendering operations, depending upon the friability of the particulate material. Thus, while the particulate material initially may be rather large, it may ultimately be reduced to a finer size in the final product.

Particles useful in the present invention have water sorptive capacity less than 10% by weight, preferably less than 1% by weight. As noted above, particles which undergo dimensional changes due to water swellability are less desirable. In view of the teachings of U.S. Pat. Nos. 4,565,663 and 4,460,642, it is surprising that hydrophobic particles and other non-swellable particles enmeshed in PTFE provide superior chromatographic articles compared to water-swellable hydrophilic particles enmeshed in PTFE.

As described in the method of U.S. Pat. No. 4,153,661, the active sorbent particles useful in the present invention can be pre-mixed with a property modifier which can function, for example, as a processing aid. Representative non-swellable property modifiers (some of which may be soluble in water) can be coated particles (e.g., cation exchange resins), calcium carbonate, ammonium carbonate, kaolin, sugar, polyethylenes, polypropylenes, polyesters, polyamides, polyurethanes, polycarbonates, zeolites, chitin, vermiculite, clay, ceramics, ion exchange and chelating particles, and the like. These property modifier materials can be present in an amount in the range of 0 to 28.99 parts per part of PTFE, preferably 0 to 9.00 parts per part of PTFE, provided that the sorbent non-swellable particles plus property modifiers do not exceed 29 parts particulate to 1 part PTFE.

Other non water-swellable property modifiers may be advantageously added to the mixture of the PTFE aqueous dispersion and the sorptive particulate and expandable or expanded particulate to provide further improvement in or modification of the composite article of the invention. For example, modifier particulate can include chromatographically inactive materials such as low surface area glass beads or bubbles to act as property modifiers and processing aids. It is desirable from a surface energy standpoint to minimize the PTFE level and at times to alter the level of the active particulate. Coloring or fluorescing particulate can be added at low levels (up to 10 weight percent of particulate) to aid in visualizing sample components to be separated. Chemically active particulate which indicate pH or acidity of the component bands can be useful for diagnostic purposes.

A limited amount of water-swellable property modifiers (i.e., up to 30 weight percent, preferably less than 25 weight percent, more preferably less than 10 weight percent, and most preferably less than 1 weight percent, of total particulate) can be useful as a processing aid. Representative swellable property modifiers include starch, chitosan, modified starches such as Sephadex TM and Sepharose TM starches (pharmacia. Sweden), agarose, polymethacrylates, styrene-divinylbenzene copolymers, polyacrylamides, cellulosics, and coated particles (e.g., silica coated with a polyacrylamide). Water-swellable materials may be used as a thin coating on non-swellable particulate.

When the particulate is hydrophobic, the preferred method of manufacture of the article of the invention utilizes an emulsion of PTFE with a masking agent added to modify the hydrophobic particle surface/water interaction and allowing rapid wetting of the surface of the hydrophobic particulate. Preferred masking agents are polar organic compounds such as alcohols, amines, acids, etc. with the preferred group being alcohols due to their efficacious removability as by solvent extraction or drying after formation of the article.

Specifically, the PTFE composite sheet material of the invention is prepared by dry blending the combination of particulates employed until a uniform dispersion is obtained and adding a volume of masking agent or lubricant up to approximately one half the volume of the blended particulate. The blending takes place along with sufficient lubricant water to exceed the sorptive capacity of the particles. The aqueous PTFE dispersion is then blended with the particulate/masking agent mixture to form a mass having a putty-like or dough-like consistency. The sorptive capacity of the solids of the mixture is noted to have been exceeded when small amounts of water can no longer be incorporated into the mass without separation. Care should be taken to ensure that the ratio of water to masking agent does not exceed 3:1. This condition should be maintained throughout the entire mixing operation. The putty-like mass is then subjected to intensive mixing at a temperature maintained below the expansion temperature of the expandable particulate for a time sufficient to cause initial fibrillation of the PTFE particles. Minimizing the mixing at the specified temperature is essential in obtaining optimal chromatographic transport properties.

Mixing times will typically vary from 0.2 to 2 minutes to obtain the necessary initial fibrillation of the PTFE particles. Initial fibrillation causes partial disoriented fibrillation of a substantial portion of the PTFE particles.

Initial fibrillation will be noted to be at an optimum within 60 seconds after the point when all components have been fully incorporated together into a putty-like (dough like) consistency. Mixing beyond this point will produce a composite sheet of inferior separations and chromatographic properties.

The devices employed for obtaining the necessary intensive mixing are commercially available intensive mixing devices which are sometimes referred to as internal mixers, kneading mixers, double-blade batch mixers as well as intensive mixers and twin screw compounding mixers. The most popular mixer of this type is the sigma-blade or sigma-arm mixer. Some commercially available mixers of this type are those sold under the common designations Banbury mixer, Mogul mixer, C. W. Brabender Prep mixer and C. W. Brabender sigma blade mixer. Other suitable intensive mixing devices may also be used.

The putty-like mass is then transferred to a calendering device where it is calendered between rolls maintained below the expansion temperature of the expandable particulate, preferably at room temperature, to cause additional fibrillation and consolidation of the PTFE particles, while maintaining the water level of the mass at least at a level of near the absorptive capacity of the solids, until sufficient fibrillation occurs to produce the desired chromatographic sheet material. Preferably the calendering rolls are made of a rigid material such as steel. A useful calendering device has a pair of rotatable opposed calendering rolls each of which may be adjusted toward the other to reduce the gap or nip between the two. Typically, the gap is adjusted to a setting of about 10 millimeters for the initial pass of the mass and, as calendering operations progress, the gap is reduced until adequate consolidation occurs. At the end of the initial calendering operation, the sheet is folded and then rotated 90° to obtain biaxial fibrillation of the PTFE particles. Smaller rotational angles (e.g., 20° to less than 90°) may be preferred in some chromatographic or separations applications to reduce calender biasing, i.e., unidirectional fibrillation and orientation. Excessive calendering in thin layer chromatographic or separations composites reduces the solvent flow rate resulting in longer run times per separation.

The calendered sheet is then dried under conditions which promote rapid water evaporation yet will not cause damage to the composite sheet or any constituent therein. The preferred drying temperature range is from 20° C. to about 50° C. The most convenient drying method involves suspending the composite sheet at room temperature for at least 24 hours. The time for drying may vary depending upon the particular composition, some particulate materials having a tendency to retain water more than others.

The resulting composite sheet has uniform porosity (homogeneous throughout) and a void volume of at least 30% of the total volume and up to 80%, preferably 40 to 60 percent.

The PTFE aqueous dispersion employed in producing the PTFE composite sheet of the invention is a milky-white aqueous suspension of PTFE particles. Typically, the PTFE aqueous dispersion will contain about 20% to about 70% by weight solids, the major portion of such solids being PTFE particles having a particle size in the range of about 0.05 to about 0.5 micrometer. Commercially available PTFE aqueous dispersions may contain other ingredients, for example, surfactant materials and stabilizers which promote continued suspension of the PTFE particles; these dispersions are less desirable for separations and purification applications.

Such PTFE aqueous dispersions are commercially available from E. I. Dupont de Nemours, Inc., Wilmington, Del., for example, under the tradenames Teflon TM 30, Teflon TM 30B or Teflon TM 42. Teflon TM 30 and Teflon TM 30B contain about 59% to about 61% solids by weight which are for the most part 0.05 to 0.5 micrometer PTFE particles and from about 5.5% to about 6.5% by weight (based on weight of PTFE resin) of non-ionic wetting agent, typically octylphenol polyoxyethylene or nonylphenol polyoxyethylene. Teflon TM 42 contains about 32 to 35% by weight solids and no wetting agent. Fluon TM PTFE, having reduced surfactant levels, is available from ICI, Exton, Pa.

It is important that the polytetrafluoroethylene fibrillated network be tight enough to support the enmeshment of the expandable particulate and sorptive particulate so that the final composite has sufficient structural integrity to be handled. In the present invention, the sorptive particulate and energy expandable particulate do not easily dislodge from the final composite, i.e., they do not fall out of the article when the article is handled. A further advantage of a PTFE fibrillated network is that PTFE fibrils are able to flow or draw out as the expandable particulate expands, thereby maintaining the structural integrity of the article. In addition, the poor bonding of PTFE to the expandable particulate also allows the fibrils to "slide" from a given microbubble's surface during the expansion step, i.e., there is poor adhesion of the fibrils to the polymeric shell of the microbubble.

The useful range of fibrillated polymer in the final composites can be from about 2% to about 50% by weight, preferably from 3% to 40%, and most preferably from 5% to 25%, based on the total weight of the composite.

Energy can be provided to the composite article to cause expansion of the expandable particulate by any of a number of means, including thermal energy from a heat source such as an oven, steam, or a heat gun, radiant energy such as that given off by an infrared light bulb and a laser such as a carbon dioxide laser, and other means known to those skilled in the art. Steam is a particularly effective expanding agent.

Useful temperature ranges for the thermal expansion step are dependent on the type of polymer used in the microbubble and on the particular blowing agent used. Typical temperature ranges are from about 20° C. to about 200° C., preferably from 50° C. to 175° C., most preferably from 70° C. to 160° C. Nobel Industries provides a series of expandable bubbles which expand at different temperatures. A more complete description of various polymers and blowing agents can be found in U.S. Pat. No. 3,615,972. Further discussion of blowing agents in general can be found in U.S. Pat. Nos. 4,640,933 and 4,694,027, which patents are incorporated herein by reference.

The length of time required for full expansion of the composite article to occur is dependent on the particular blowing agent, the nature of the polymeric shell of the bubble, and the efficiency of heat transfer to the article. For most microbubbles, about five minutes in a convection oven set at a temperature slightly higher than the softening point of the polymeric shell is sufficient to allow full expansion. In cases where heat transfer to the article is much more efficient, such as with the use of steam as a heat source, expansion can occur much more quickly, generally in less than 30 seconds. It is also possible to only partially expand the microbubbles by controlling the length of time the composite article is exposed to the expansion temperature or exposing the microbubbles to a temperature below the normal expansion temperature such that individual microbubbles have only expanded to a fraction of their potential volume. In this way, the final volume and density of the article can be controlled, in those cases where this is desirable.

Care must be taken to avoid over-exposure of the composite article to elevated temperatures since the blowing agent can be driven from the interior of the polymeric microbubble faster than air can permeate into the interior to maintain constant internal pressure, thus causing a collapse of the structure. Conditions for expansion of particulate vary depending upon the particulate used and the degree of expansion desired.

Controlling the interstitial porosity of the sheet material has great utility in composite materials utilized in the science of separations and purifications. It is known to provide porosity in sheet materials by using added property modifier particulate which can be dissolved out of the sheet material, via washing, leaving voids. Use of controlled levels of lubricant fluid during the manufacture also has been shown to control void volume or porosity. The present invention provides sheet-like articles which have great utility in separations and purification applications by controlling porosity by use of expandable particulate.

Control of porosity greatly enhances the utility of chromatographic and separations articles. Two types of porosity are involved: 1) the internal porosity of the sorptive particles and 2) the flow through or interstitial porosity of the composite article. Proper choice of the sorptive particle porosity depends on the intended application, typically 60 to 100 Angstrom pores for small molecules such as drugs, pesticides, pollutants, etc., and 200 to 1000 Angstrom pores for large biomolecules. Type of particulate includes both organic and inorganic materials and determines the sorptive or reactive specificity of the composite article.

Interstitial porosity controls the distance between sorptive particles which determines the diffusion kinetics of the composite, wherein $t_d = d^2/2D$, where $t_d$ is the time required for diffusion of a molecule for distance d and D is the diffusion coefficient of the medium, e.g., air, water, etc. The present invention typically utilizes 8-10 micrometer sorbent particles with 60 Angstrom internal pores and high surface area, e.g., 100-500 $m^2/gm$, for efficient separations. Interstitial porosity controlled by the expandable polymeric particulate determines the rate at which fluids can be passed through the composite article, i.e., residence time and linear flow velocity. Typical interstitial porosity for separation articles of the present invention range between 0.1 and 10 micrometers. The resultant composite article has great utility in rapid and efficient processing of fluids to isolate pollutants, drugs, and biomolecules in environmental and bioprocessing applications.

The articles of the present invention are uniquely suited in separations devices where elimination of voids and channels is desirable at confining surfaces, such as in cylindrical tubes or columns between flat restraining plates, or in any confined geometric space. Upon energy expansion, the article, either in the form of a flat sheet (round, square, or any geometric shape) or roll, can snugly fill and conform to the shape of a confined volume. For example, a chromatograph column or cartridge can be loosely fitted with a rolled sheet, then energy applied to the composite column or cartridge, causing expansion to provide a snugly fitting material which eliminates voids and channels in separations applications.

Objects and advantages of this invention are further illustrated by the following examples, but the particular materials and amounts thereof recited in these examples, as well as other conditions and details, should not be construed to unduly limit this invention. Unless otherwise stated, all parts and percentages are by weight.

EXAMPLE 1

A group of seven chromatographic sheets comprising a PTFE fibrillated matrix and a combination of TLC silica (Aldrich Chemical Co.) and Expancel 551DU polymeric particles enmeshed therein was prepared as follows:

Varying ratios of Expancel 551 DU microspheres and TLC grade silica were dry blended to obtain a range from 0% to 50% by weight Expancel microspheres with respect to silica particulate. Sample 1, the 0% sheet, was made by mixing 20 g silica with 7.1 g Fluon PTFE emulsion containing 27.9 weight percent solids. Thirty-five gm of 50:50 volume percent isopropanol:water was then added and blending occurred to obtain a mass with dough-like consistency. The mass was then calendered with a roll temperature of 38° C. and a gap between the rolls of 0.38 cm. After the initial calendering, the sheet is folded and rotated 90 degrees to obtain biaxial fibrillation of the PTFE particles. The gap between the calendering rolls was reduced in increments of 0.13 cm and the sheet recalendered. Folding, rotating the sheet, reducing the gap, and recalendering was repeated until the composite sheet thickness was 0.05 cm. This procedure was repeated for samples 2, 3, 4, 5, 6, and 7 with the exception that the weights of Expancel microspheres:silica were 0.04:19.96, 0.20:19.80, 0.60:19.4, 1.20:18.8, 4.00:16.00, and 10.00:10.00 g, respectively. The seven composite sheets then contained 0, 0.2, 1.0, 3.0, 6.0, 20.0, and 50.0 weight percent Expancel microspheres with respect to TLC silica particulate. The composite sheets were dried at room temperature for 24 hours.

Figure 1:
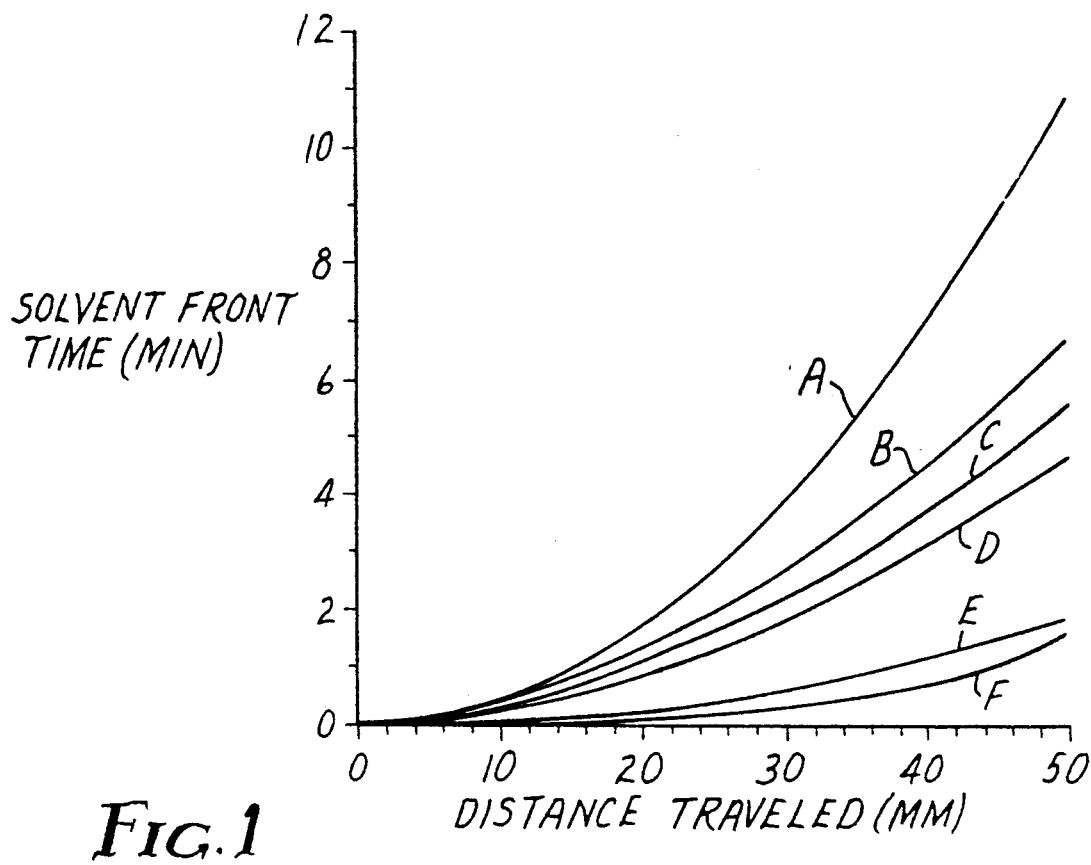
FIG. 1 is a plot of time vs. distance traveled for a solvent front in thin layer chromatography (TLC) in articles of the invention in which the proportion of expanded particulate to sorptive particulate is varied.
Figure 2:
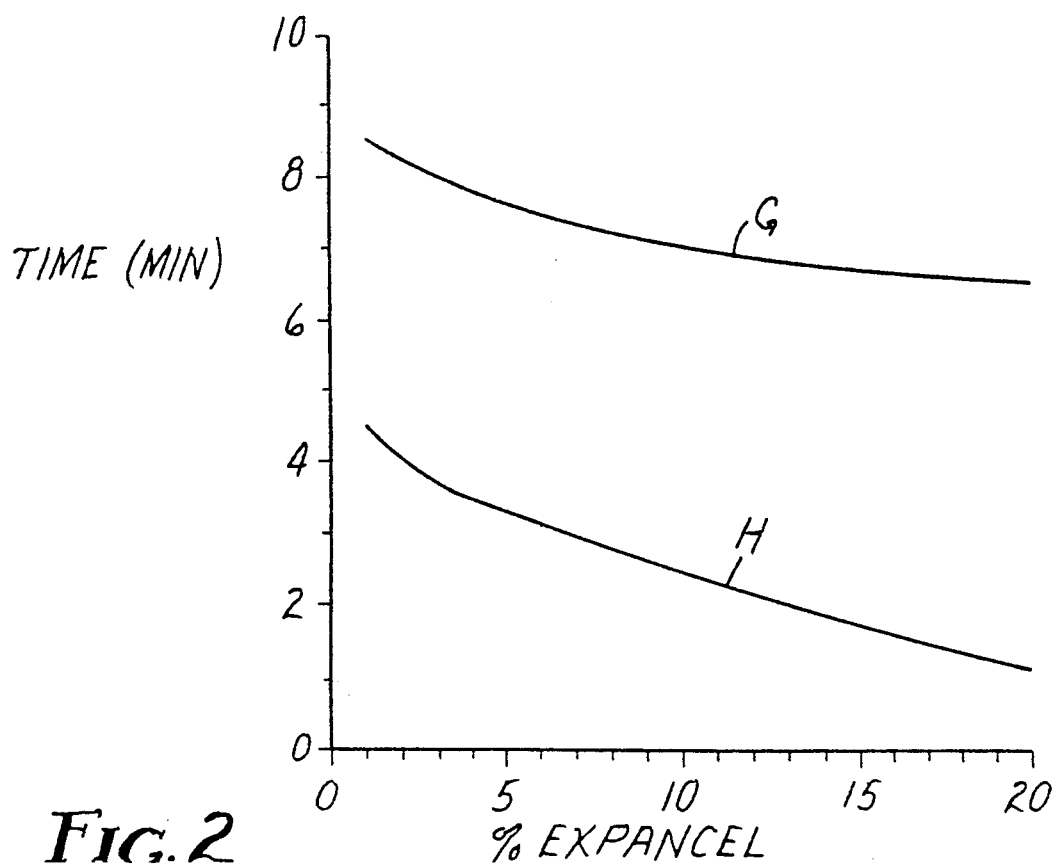
FIG. 2 is a plot of a TLC solvent front rate vs. percent unexpanded particulate and vs. percent expanded particulate.

Table 1, below, shows the data obtained for toluene solvent migration rates by incorporating different levels of Expancel microbubbles in a TLC (thin layer chromatography) silica formulation. These rates directly correlated to "flow through" (interstitial) pore sizes obtained before and after thermal expansion of the composite article. FIG. 1 shows the effect of the weight percent of Expancel microspheres on TLC elution rates after expansion. In this example, the amounts of Expancel microspheres were varied from 0.2 to 50% and a standard TLC test dye mixture (IV 30-04, available from Analtech, Inc., Newark, Del.) was used to determine the effect of Expancel microbubble concentration on the $R_f$ values (retardation factors), as discussed in C. F. Poole, et al., "Contemporary Practice of Chromatography", Elsevier, N.Y. (1984) pp. 625-626, versus that observed for conventional TLC separations. Plots A through F in FIG. 1 represent the following weight percent ratios of Expancel microbubbles to silica: A (0.2/99.8), B (1/99), C (3/97), D (6/94), E (20/80), F (50/50). The $R_f$ data indicate that amounts greater than about 20% gave degraded performance of the silica TLC application. The preferred range for TLC was from 0.2 to 20%. FIG. 2 shows the TLC solvent front rate for samples B, C, D, and E, listed above at a solvent front distance of 40 mm before expansion (plot G) and after expansion (plot H). The upper curve for the unexpanded article shows a slight increase in solvent front rate as the percentage of Expancel microbubbles with respect to silica is increased. This may be due to the enhanced "wetting" characteristics of the Expancel particles. The lower curve for the expanded article shows the unexpected parallel relationship between unexpanded and expanded articles over the 1 to 20% concentration range. The increased rate is not directly proportional to the Expancel particulate concentration. This indicates that the more preferred range of Expancel particulate concentration is from 1 to 10% and the most preferred range for TLC applications is from 1 to 6% with respect to the silica concentration. Table 2, below, lists the data for the unexpanded and expanded articles.

TABLE 1

| | Elution Time-Toluene Solvent (minutes) | | | | | | |
| | Weight % Expancel Microspheres in TLC Silica | | | | | | |
| Solvent Front (MM) | Sample 1 0% | Sample 2 0.2% | Sample 3 1% | Sample 4 3% | Sample 5 6% | Sample 6 20% | Sample 7 50% |
| --- | --- | --- | --- | --- | --- | --- | --- |
| 5 | 0.15 | 0.15 | 0.13 | 0.10 | 0.07 | — | — |

TABLE 1-continued

| | Elution Time-Toluene Solvent (minutes) Weight % Expancel Microspheres in TLC Silica | | | | | | |
|---|---|---|---|---|---|---|---|
| Solvent Front (MM) | Sample 1 0% | Sample 2 0.2% | Sample 3 1% | Sample 4 3% | Sample 5 6% | Sample 6 20% | Sample 7 50% |
| 10 | 0.63 | 0.37 | 0.40 | 0.30 | 0.23 | — | — |
| 15 | 1.30 | 0.93 | 0.80 | 0.63 | 0.52 | — | — |
| 20 | 2.40 | 1.73 | 1.33 | 0.63 | 0.52 | — | — |
| 25 | 3.60 | 2.66 | 1.93 | 1.60 | 1.30 | 0.38 | 0.20 |
| 30 | 5.03 | 3.83 | 2.67 | 2.20 | 1.80 | 0.60 | 0.32 |
| 35 | 6.85 | 5.33 | 3.50 | 2.88 | 2.40 | 0.87 | 0.47 |
| 40 | 8.70 | 6.93 | 4.50 | 3.68 | 3.12 | 1.13 | 0.68 |
| 45 | 10.90 | 8.87 | 5.60 | 4.60 | 3.87 | 1.50 | 1.03 |
| 50 | 13.50 | 10.93 | 6.70 | 5.58 | 4.68 | 1.87 | 1.57 |

TABLE 2

TLC Elution Rates Before and After Expansion (at 40 mm Solvent Front Travel)

| Sample # | Wt. % Expancel microspheres (in silica) | Before Expansion Time (min) | After Expansion Time (min) |
|---|---|---|---|
| 1 | 0.0 | 8.70 | 8.70 |
| 2 | 0.2 | 8.00 | 6.93 |
| 3 | 1.0 | 8.53 | 4.50 |
| 4 | 3.0 | 7.97 | 3.68 |
| 5 | 6.0 | 7.47 | 3.12 |
| 6 | 20.0 | 6.55 | 1.13 |
| 7 | 50.0 | 6.07 | 0.68 |

Figure 3:
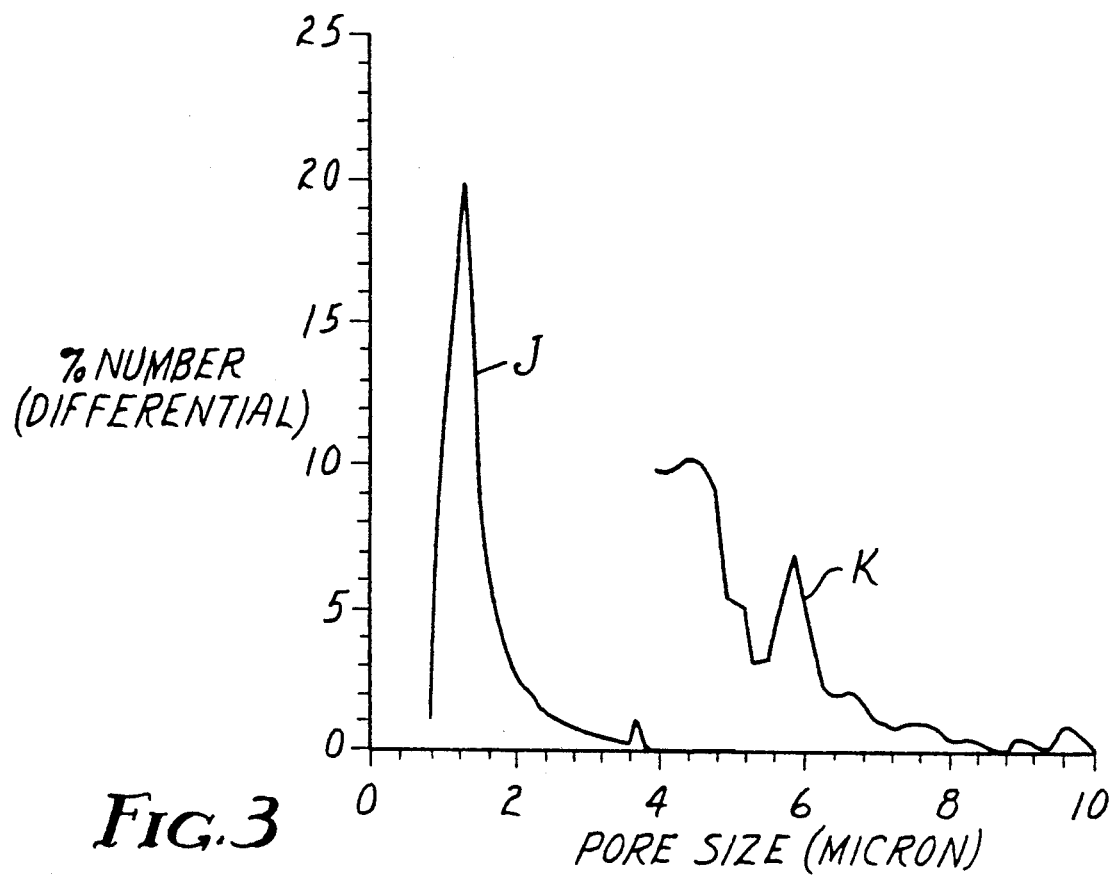
FIG. 3 is a plot of percent numbers of pores vs. pore size in unexpanded and expanded articles of the invention.

Increasing the percentage of Expancel microspheres with respect to the silica particulate decreased the time for the solvent front to reach the 40 mm distance from the origin in the unexpanded article and this could be due to the "wetability" or polarity of Expancel particles. The solvent front rate however increases dramatically after these same formulations are thermally expanded at 120° C. for 3 minutes as shown in Table 2. This could be due to the increased surface area of the Expancel microspheres or increased interstitial porosity resulting from the particle expansion disrupting the spatial characteristics of the particle packing. A plot of the data (FIG. 2) in Table 2 shows some unexpected results of expansion. As noted, the data lines are nearly parallel for the expanded articles (plot H) and unexpanded articles (plot G). The data further demonstrate that the amount of expansion is not a linear function of Expancel microsphere concentration. FIG. 3 is a plot of the interstitial porosity before (plot J) and after (plot K) thermal expansion of one of the formulations (6% Expancel microspheres in TLC silica). The unexpanded article had a mean pore size of 1.7 micrometers while the article after expansion had a mean pore size of 5.8 micrometers as measured with a Coulter Porometer TM (Coulter Electronics Ltd, Luton, England). Distribution of flow through pore sizes broadened considerably after expansion. Table 3 shows the data obtained for the thickness of the various formulations before and after thermal expansion at 120° C. for 3 minutes.

TABLE 3

| | Composite Sheet Thickness Before and After Expansion | | |
|---|---|---|---|
| Sample # | Wt. % Expancel microspheres (in silica) | Before Expansion Thickness (cm) | After Expansion Thickness (cm) |
| 1 | 0.0 | 0.051 | 0.051 |
| 2 | 0.2 | 0.038 | 0.053 |
| 3 | 1.0 | 0.041 | 0.061 |
| 4 | 3.0 | 0.043 | 0.066 |
| 5 | 6.0 | 0.048 | 0.074 |

TABLE 3-continued

| | Composite Sheet Thickness Before and After Expansion | | |
|---|---|---|---|
| Sample # | Wt. % Expancel microspheres (in silica) | Before Expansion Thickness (cm) | After Expansion Thickness (cm) |
| 6 | 20.0 | 0.048 | 0.107 |
| 7 | 50.0 | 0.051 | 0.130 |

EXAMPLE 2

A series of four composite sheets were prepared by dry blending varying ratios of Expancel 551DU microspheres and $C_{18}$ bonded silica to obtain a range from 1% to 50% by weight Expancel With respect to silica particulate. Sample 8, the 1% sheet, was made by mixing 0.25 g Expancel microspheres and 24.75 g $C_{18}$ silica with 8.9 gm Fluon PTFE emulsion from ICI containing 27.9 weight percent solids. Twenty-six g of 50:50 volume percent isopropanol:water was then added and the mix blended to obtain a mass with dough-like consistency. The mass was then calendered at a roll temperature of 38° C. After the initial calendering, the sheet was folded and rotated 90 degrees to obtain biaxial fibrillation of the PTFE particles. The gap between the calendering rolls was reduced as in Example 1 and the sheet recalendered. Folding, rotating the sheet, reducing gap, and recalendering was repeated according to Example 1 until the composite sheet thickness was 0.05 cm. This procedure was repeated for samples 9, 10, and 11 with the exception that the weights of Expancel:$C_{18}$ silica were 1.25:23.75, 5.0:20.0, and 12.5:12.5 g, respectively. The four composite sheets then contained 1.0, 5.0, 20.0, and 50.0 weight percent Expancel microspheres with respect to $C_{18}$ silica particulate. The composite sheets were dried at room temperature for 24 hours.

The composite sheets were then evaluated in solid phase extraction (SPE) applications. A test compound, Disperse Red 1 (Aldrich Chemical Co., Milwaukee, Wis.), which behaves like many pesticide and drug molecules with respect to SPE was dissolved in water containing 0.5% methanol to promote wetting of the hydrophobic particulate. A liter of this solution containing 100 parts per billion (ppb) of the red dye was then filtered through each composite sheet to determine the effect of Expancel microspheres on extraction efficiency and filtration time. A vacuum of about 700 mm of Hg was used to pull the water solution through a 47×0.5 mm disc. A cross sectional view of the composite article was then obtained and the degree of penetration of the red dye was measured. Table 4 lists the data obtained for a series of concentration levels before and after expansion of the articles.

TABLE 4

Membrane Flow & Efficiency Before and After Expansion

| Sample # | Wt. % Expancel microspheres (in $C_{18}$ silica) | Before Expansion Time/Liter (sec) | After Expansion Time/Liter (sec) | Dye Penetration (expanded) |
|---|---|---|---|---|
| 8 | 1.0 | 301 | 262 | <10% |
| 9 | 5.0 | 302 | 187 | <10% |
| 10 | 20.0 | 395 | 81 | 10% |
| 11 | 50.0 | 366 | 60 | 90% |

The data show that the presence of unexpanded Expancel microbubbles which are subsequently expanded dramatically increased the flow rate as would be expected due to the porosity increase resulting from expansion. The increase in porosity is especially important when particulate laden (river, lake) water is to be filtered or extracted to recover pesticides and other pollutants. The more open porous structure is less subject to plugging and is desirable for dirty waters and biological fluids. It appears that SPE efficiency decreases above 50% Expancel microbubble levels (penetration is near breakthrough point).

Figure 4:
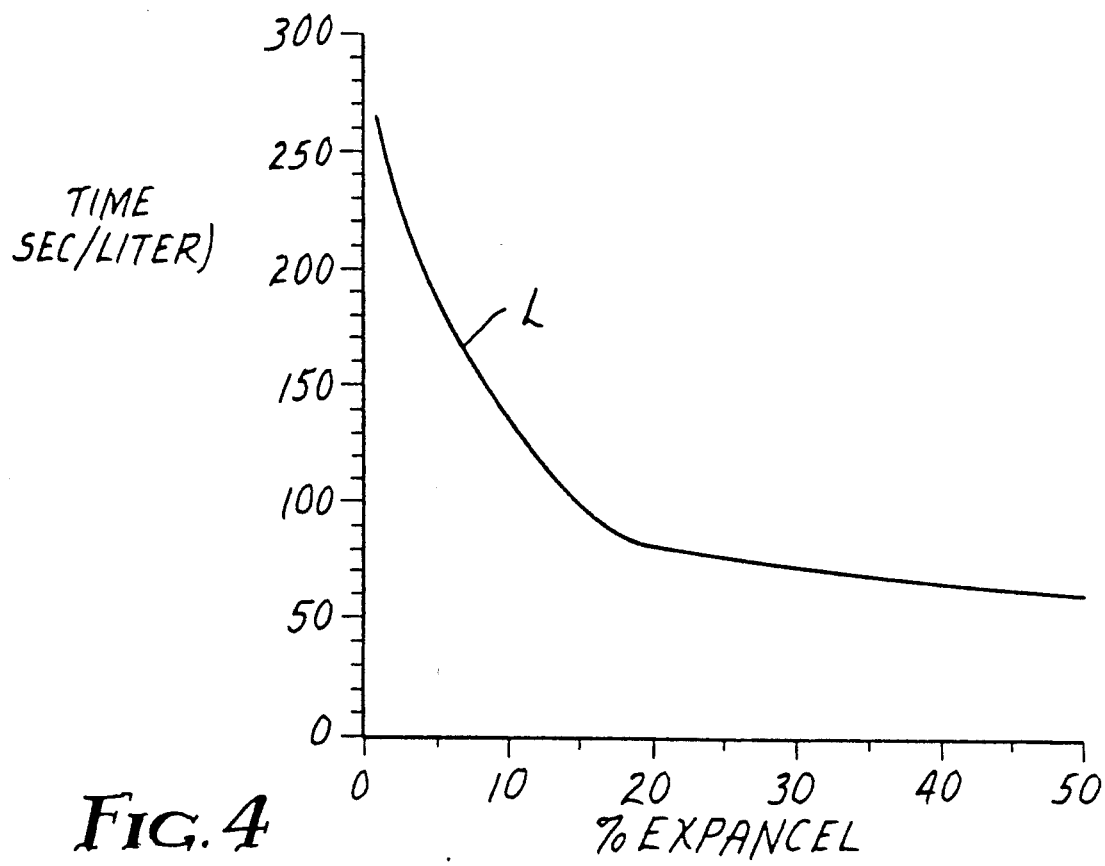
FIG. 4 is a plot of flow rates vs. percent expanded particulate in articles of the invention.

At the breakthrough point, a loss of analyte begins that is undesirable in SPE. FIG. 4 is a plot (L) of the flow data in Table 4. It is to be noted that the flow rates were not a linear function of the expanded Expancel microbubble concentration.

Table 5 illustrates the relationship observed between levels of Expancel microbubbles and ability of the composite articles to extract hydrophobic pollutants such as phthalates from water. One liter water samples containing trace levels (100 ppb) of dimethyl-, diethyl-, and dibutyl-phthalates were filtered through sample articles 8 through 11. The phthalates were then recovered from the sample composite articles in a concentrated form by elution with a small volume (10 ml) of acetonitrile solvent which effectively displaced the phthalates from the hydrophobic $C_{18}$ bonded silica particulate. Phthalate concentrates were then analyzed by liquid chromatography to determine the efficiency of the articles in extracting the phthalates from the aqueous media.

TABLE 5

Effect of Expancel Microspheres Level on $C_{18}$ Silica - SPE Phthalates Recovery (%)

| Sample # | Wt. % Expancel microspheres (in $C_{18}$ silica) | Dimethyl-phthalate | Diethyl-phthalate | Dibutyl-phthalate |
|---|---|---|---|---|
| 8 | 1 | 85 | 99 | 102 |
| 9 | 5 | 71 | 90 | 100 |
| 10 | 20 | 31 | 95 | 99 |
| 11 | 50 | 0 | 70 | 103 |

The data of Table 5 show the percent recovery of dimethylphthalate decreased rapidly with the increasing percent of Expancel microspheres indicating that the sorptive capacity of the composite was directly proportional to the $C_{18}$ silica particulate percentage and that Expancel microspheres were ineffective as a sorbent for the hydrophobic phthalates. Diethyl and dibutyl phthalate recoveries were less affected because of their stronger affinities for even low percentages of the $C_{18}$ silica particulate. These data also demonstrate that increasing Expancel microsphere percentages may inversely affect sorptive capacity of the composite article. Other types of expandable particulate can be utilized to increase interstitial porosity and dependent on chemical composition can add or detract from the net sorptive capacity of the composite article.

EXAMPLE 3

A composite article, sample 12, containing 6% unexpanded Expancel 551DU polymeric microspheres by weight of hydrophobic $C_{18}$ bonded silica particulate, made as in Example 2, was cut into a 1×4 cm strip. The strip was then rolled into a 1 cm high cylindrical form (as shown in FIG. 5) and inserted into a cylindrical column. It was loosely fitting and individual layers of the wrapping were visually observable. The assembly was then placed in a convection oven at 120° C. for 3 minutes to effect expansion. After heating, the individual layers had expanded, fusing together, and the resulting cylindrical roll as shown in FIG. 6 was firmly held in place in the column without the need for conventional confining top and bottom particle retaining frits or porous retaining supports. After cooling, the expanded column article was wetted with methanol as recommended in solid phase extraction art described by Hagen et al., *Analytica Chimica Acta*, 236, (1990) 157–164. An aqueous solution containing a green test dye (McCormick & Co., Inc., Baltimore, Md.) and 0.5% methanol was then pulled through the column using a vacuum of 700 mm of Hg, as described in Example 2. Visual inspection showed that the expanded column article efficiently trapped the dye at the top of the column with little evidence of voids or channeling between the original individual layers or the particle-wall interface which is commonly observed with conventional particle packed columns. It is known in the art to collapse flexible wall columns inward by external radial compression to help eliminate voids and channels at the column wall interface. In contrast, the composite sheet of this invention which comprises a combination of sorptive particles and expandable microspheres in a PTFE matrix expands radially outward to eliminate voids and channels at the rigid column wall interface. The unexpanded composite article of this invention can be placed in a variety of confining geometrical structures and subsequently expanded to conform to the geometry of the confining structures to provide devices useful in the separation and purification sciences.

EXAMPLE 4

Forced flow planar chromatography is known in the art and consists of a sorbent sheet material clamped between a rigid plate and a flexible plate which is akin to a bladder, see, for example, L. Botz et al., *Journal of Liquid Chromatography*, 13(14), 2809–2828 (1990). The side edges are sealed and fluid pressure is applied to the flexible plate compressing the sorbent sheet material between the plates to prevent channeling and eluant/solvent flow over the surfaces of the sorbent sheet. Elutant is forced into the edge of the sheet through an inlet port using a constant flow pump. The analytes separated by eluant flow through the sorbent media exit to a detector through a port at the end opposite of the inlet port. In contrast to the prior art method, this invention provides rigid plates (such as glass) between which are sandwiched a PTFE fibril composite comprising expandable microspheres and sorptive particulate enmeshed therein. Formulations of silica or C₁₈ bonded silica, as in Examples 1 and 2, can be used to effect specific separations. A wide range of other sorptive particulate described in the art can also be used. Use of a composite article of the invention in such a device eliminates the need to apply external pressure and the need for a flexible plate. The internal pressure generated between the two rigid plates as a result of expansion of the expandable particulate in the composite article of the invention is dependent on both the amount of expandable particulate in the composite and the degree of expansion. The present invention provides an efficient means of performing forced flow planar chromatography.

Various modifications and alterations of this invention will become apparent to those skilled in the art without departing from the scope and spirit of this invention, and it should be understood that this invention is not to be unduly limited to the illustrative embodiments set forth herein.

We claim:

1. An article useful in separations or purification applications comprising
   a) a polytetrafluoroethylene (PTFE) matrix, and
   b) enmeshed therein a combination of sorptive particulate and energy expandable or expanded hollow polymeric particulate.

2. The article according to claim 1 wherein the ratio of PTFE to combination of sorptive particulate and energy expandable or expanded particulate is in the range of 2:98 to 50:50 percent by weight.

3. The article according to claim 1 wherein the ratio of sorptive particulate to energy expandable particulate is in the range of 3:1 to 1000:1 by weight.

4. The article according to claim 2 further comprising property modifying particulate in the amount of greater than 0 and up to 28.99 parts per part of PTFE, provided that the sorptive particulate plus property modifying particulate do not exceed 29 parts particulate to 1 part PTFE.

5. The article according to claim 1 wherein said hollow particulate comprises a fluid core and a polymeric shell.

6. The article according to claim 5 wherein said fluid is a liquid.

7. The article according to claim 5 wherein said polymeric shell comprises a copolymer selected from the group consisting of vinylidene chloride and vinyl chloride, vinyl chloride and acrylonitrile, vinylidene chloride and acrylonitrile, styrene and acrylonitrile, methyl methacrylate and styrene, methyl methacrylate and ethyl methacrylate, and methyl methacrylate and ortho-chlorostyrene.

8. The article according to claim 5 wherein said fluid core is selected from the group consisting of one or more aliphatic hydrocarbons, halocarbons and tetraalkyl silanes.

9. The article according to claim 8 wherein said aliphatic hydrocarbon has a number average molecular weight of at least 26 and a boiling point about the same temperature range or below the softening temperature of said polymeric shell when saturated with blowing agent.

10. The article according to claim 1 wherein said sorptive particulate is selected from the group consisting of carbon, an organic compound, a polymer, and inorganic oxide.

11. The article according to claim 1 wherein said sorptive particulate is at least one of carbon, silica, and zirconia.

12. The article according to claim 10 wherein said sorptive particulate has a coating of insoluble, non-swellable sorbent material.

13. The article according to claim 1 having porosity in the range of 30 percent to 80 percent.

14. The article according to claim 13 having an average mean pore size in the range of 0.1 to 10 micrometers.

15. An energetically expanded article according to claim 1.

16. An article comprising a tube having rolled up therein the article according to claim 1.

17. The article according to claim 1 which is sandwiched between two rigid plates for use in forced flow chromatography.

18. A process for chromatographically evaluating a fluid comprising the step of contacting the expanded article according to claim 1 with said fluid.

19. The process according to claim 18 further comprising the step of rolling up the article and then expanding it prior to use in said chromatographic process.

20. A process for extracting a pollutant from a fluid comprising the step of passing said fluid through the expanded article according to claim 1.

21. The process according to claim 20 further comprising the step of rolling up the article and then expanding it prior to use in said extracting process.

* * * * *

UNITED STATES PATENT AND TRADEMARK OFFICE
CERTIFICATE OF CORRECTION

PATENT NO. : 5,248,428
DATED : September 28, 1993
INVENTOR(S) : Donald F. Hagen et al.

It is certified that error appears in the above-indentified patent and that said Letters Patent is hereby corrected as shown below:

Col. 1, line 46, "none-swellable" should read -- non-swellable --.

Col. 7, line 58, "pharmacia" should read -- Pharmacia --.

Col. 14, line 32, "Expancel With" should read -- Expancel with --.

Signed and Sealed this

Twenty-fourth Day of May, 1994

Attest:

BRUCE LEHMAN

Attesting Officer

Commissioner of Patents and Trademarks